May 21, 1968

G. E. HERBERT ET AL 3,384,525

APPARATUS FOR APPLYING CUFFS TO THE ENDS OF
FLEXIBLE TUBULAR MEMBERS

Filed Oct. 2, 1964

INVENTORS
George E. Herbert
Richard B. Pelley
BY Blair and Buckles
ATTORNEYS

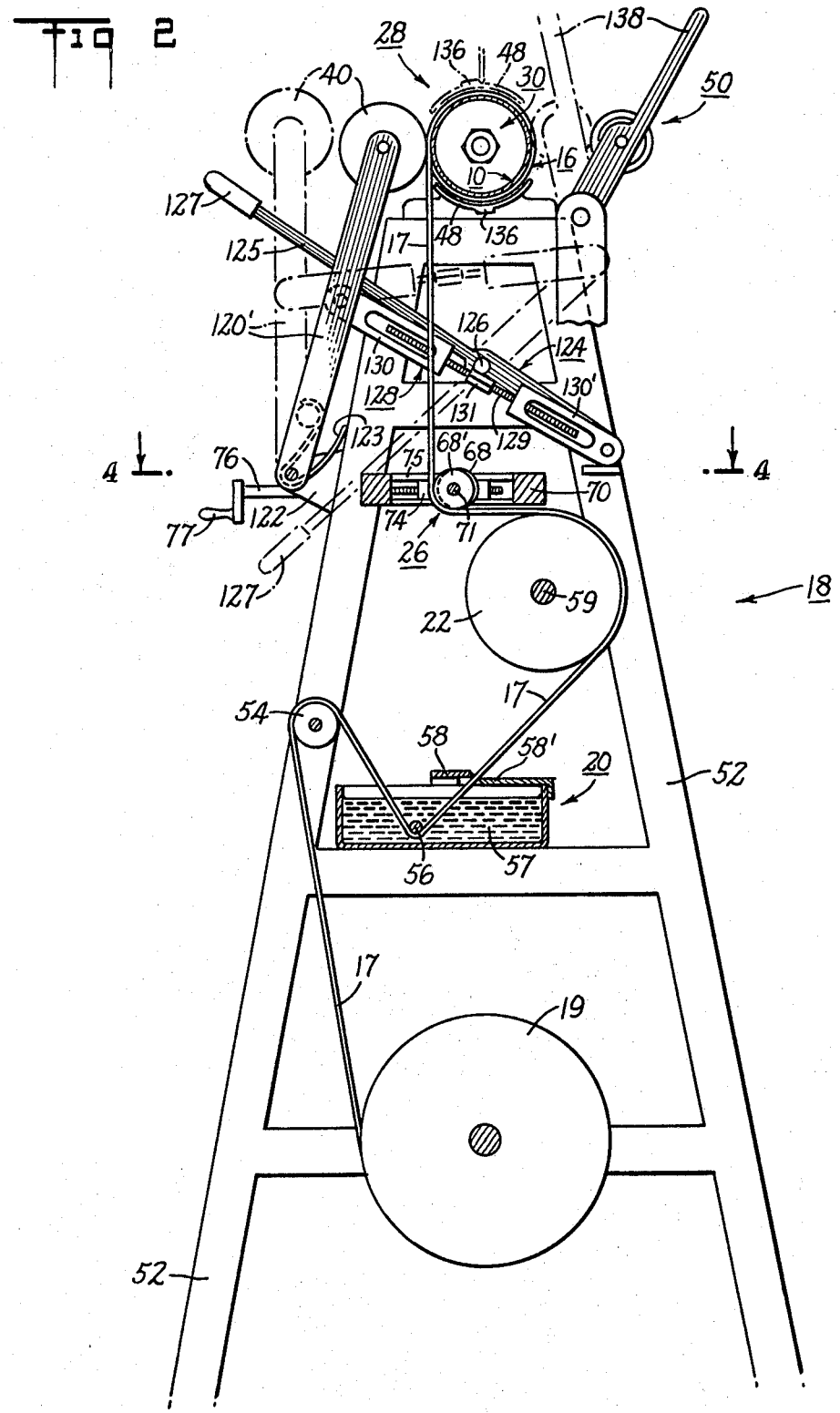

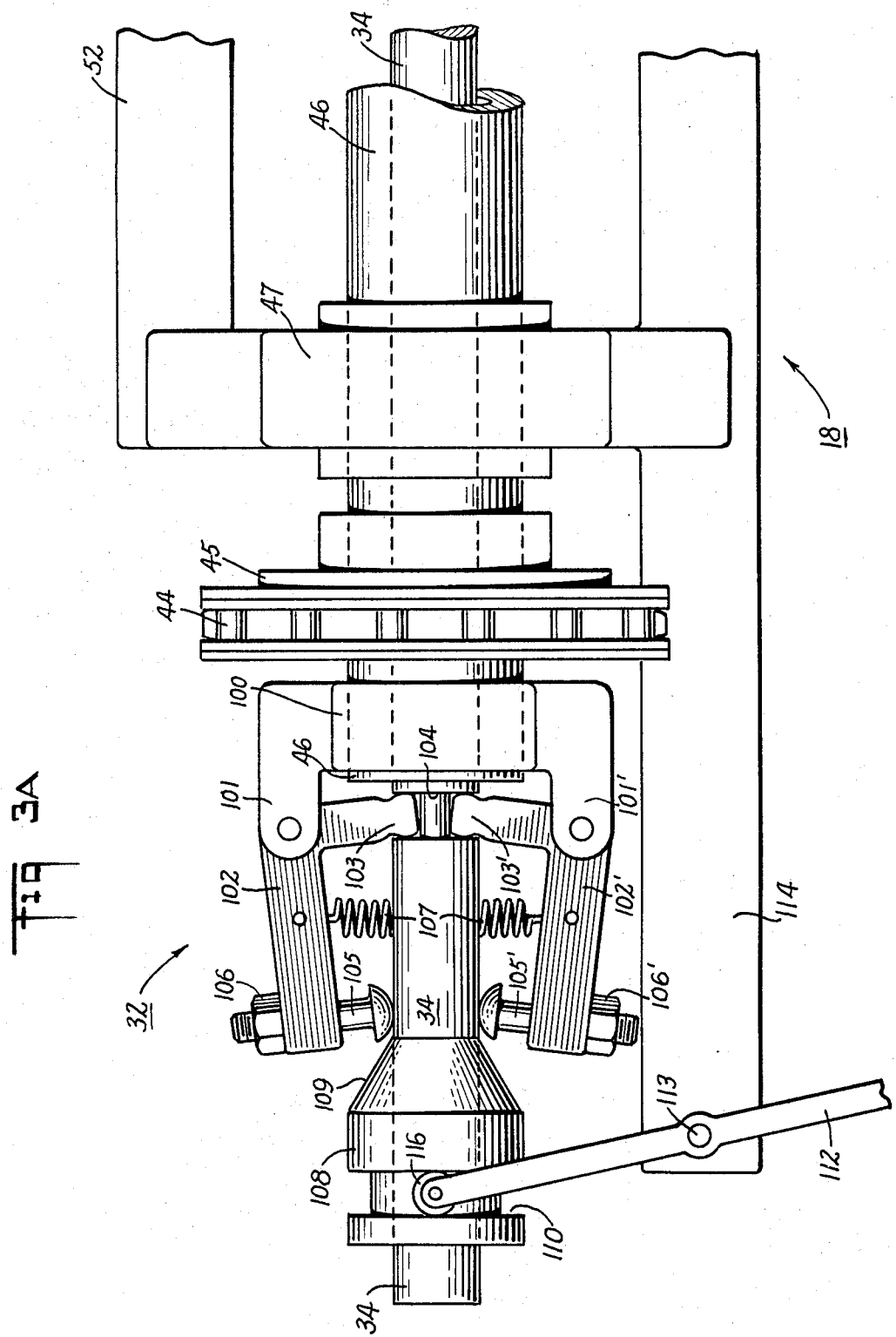

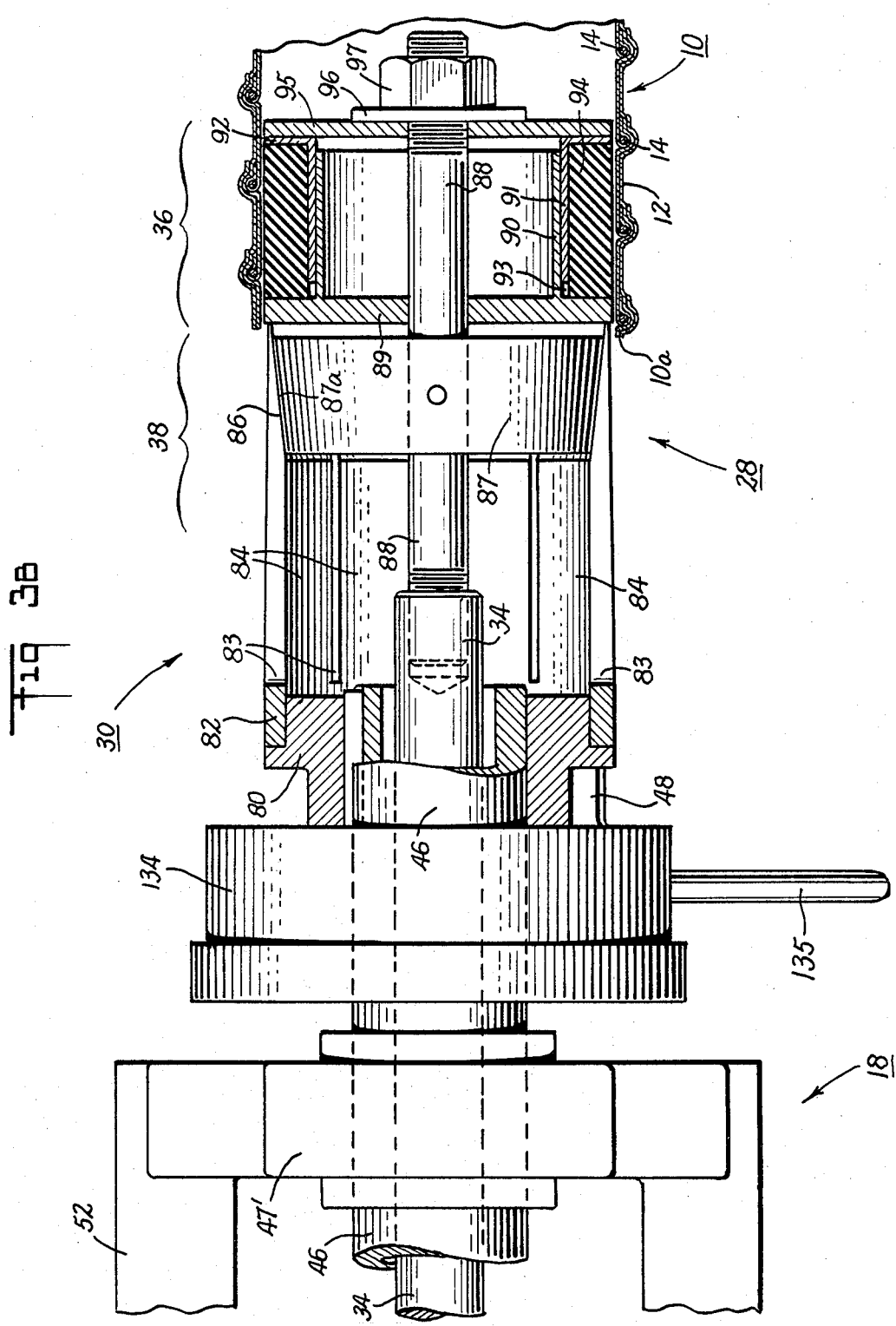

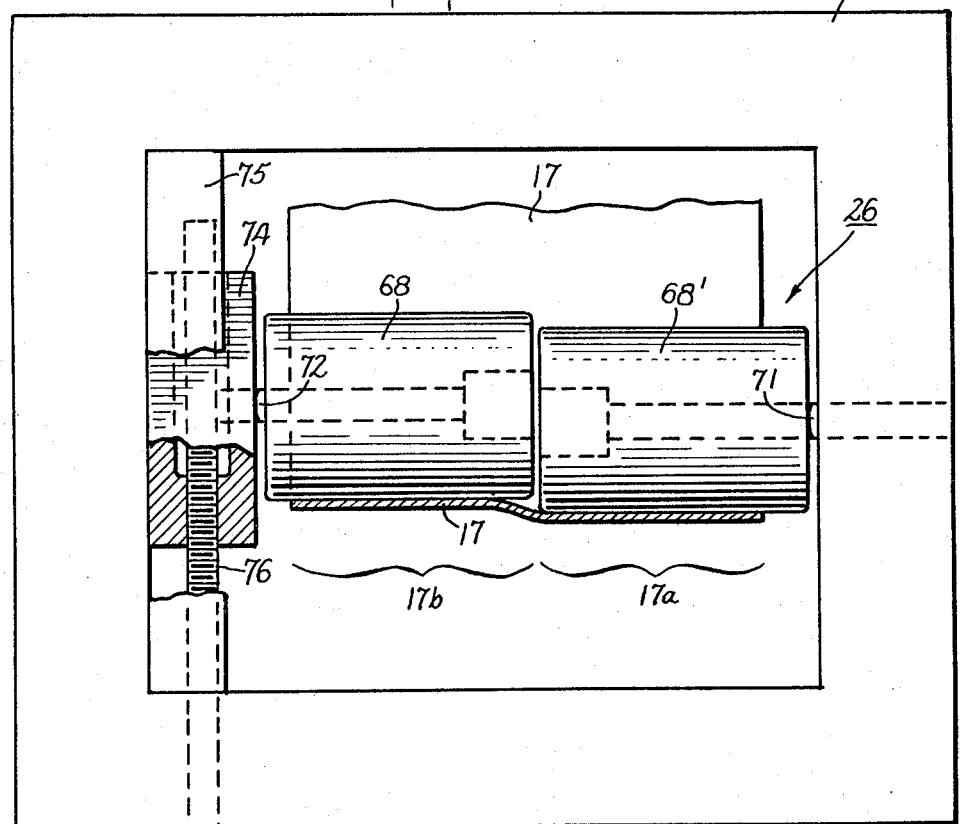
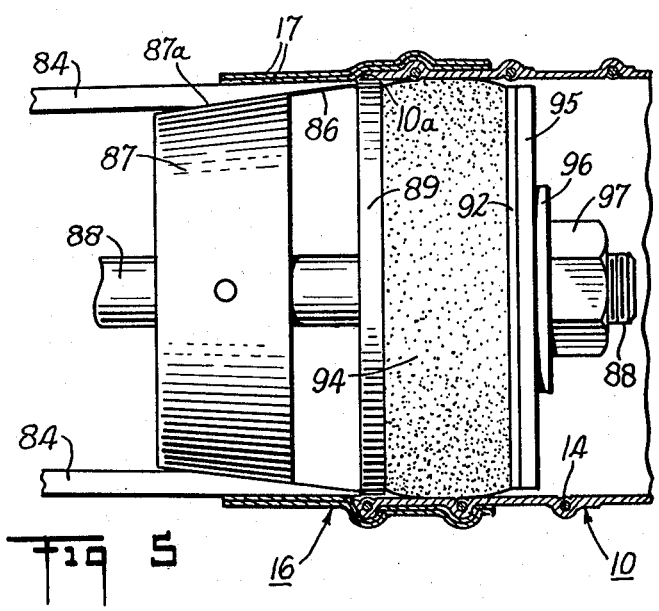

United States Patent Office 3,384,525
Patented May 21, 1968

3,384,525
APPARATUS FOR APPLYING CUFFS TO THE ENDS OF FLEXIBLE TUBULAR MEMBERS
George E. Herbert, Haverhill, Mass., and Richard B. Pelley, East Kingston, N.H., assignors to Callahan Mining Corporation, New York, N.Y.
Filed Oct. 2, 1964, Ser. No. 401,070
10 Claims. (Cl. 156—446)

ABSTRACT OF THE DISCLOSURE

Disclosed herein is a motor driven apparatus for applying a cuff to a tubular member such as a length of flexible hose. The tubular member is supported on an expandable mandrel. Cuffing tape is fed from a supply through an adhesive containing tray and over a tension roll, and an axially offset roller assembly causes the cuffing tape to be stretched along one longitudinal edge relative to the other longitudinal edge. The tape is then wrapped about the end of the tubular member with the stretched edge overlapping the end thereof and the other edge overlapping the mandrel. A pressure roller bears against the mandrel to insure adherence of the cuffing tape. A platen is movable under the free end of the tape so that it may be severed with a knife and a cutter wheel is pivotably mounted adjacent the mandrel for trimming the free edge of the finished cuff.

---

The present invention relates to a cuffing machine. More particularly, it relates to an apparatus for applying a cuff to the ends of tubular members.

The invention has particular application in the manufacture of flexible hose such as described in Patent No. 2,678,298 to R. G. Bringolf and Patent No. 2,759,521 to J. T. Hall et al. However, the invention may be employed in the production of a variety of tubular members.

In the manufacture of flexible hose of the type described in the above-noted patents, a continuous, flexible tape, preferably reinforced with a wire incorporated along one edge, is formed into a series of helical overlapping loops. In forming the hose the overlapping edge portions of the tape are bonded together by an adhesive providing a continuous helical seam extending the entire length of the hose. It will be appreciated that, in employing this so-called "continuous wind" manufacturing process, the initial and terminating tape loops at the ends of the completed hose are axially displaced from what would be considered the body of the hose. The hose ends have to be squared off by hand. This is usually done with a hand knife resulting in a rather jagged end. Typically, a cuff is applied to one or both ends of the hose not only to give it a more attractive appearance, but also to better adapt the hose to fittings or connections when in use.

Heretofore, the cuffs applied to flexible hose were formed from an elongated tape material, generally corresponding to the hose material, wound by hand tightly about the end of the hose with the end portion of the hose slipped over a mandrel. This manual cuffing operation proves to be a time consuming procedure requiring considerable manual dexterity and strength. The cuffing tape must be found around the end of the hose in overlying layers with considerable tension in order to provide a good appearance and to insure that the tape adheres to the hose as well as to underlying layers. Moreover, the cuffing tape must be selectively stretched by hand in order that the portion of the cuff overlapping the end of the hose conforms to the outer diameter of the hose while the portion of the cuff wound on the mandrel beyond the end of the hose conforms to the inside diameter of the hose. Any wrinkles in the cuffing tape after it has been wound about the ends of the hose are smoothed out by hand.

Another problem arises when one attempts to remove the cuffed hose from the mandrel. Since a portion of the cuffing tape is wound tightly about the mandrel beyond the end of the hose, it is found that considerable manipulation and tugging is required to remove the cuffed hose.

It is accordingly a general object of the present invention to provide a cuffing machine for applying a cuff to the ends of tubular elements.

A further object is to provide a cuffing machine of the above character adapted to wind a flexible tape material about the ends of tubular elements to form a cuff.

An additional object is to provide a cuffing machine of the above character for overcoming the disadvantages of the hand operation practiced heretofore.

A further object of the present invention is to provide a cuffing machine of the above character which is capable of winding a tape about the end of a flexible hose while imparting predetermined pressures and tensions to the tape so as to form a wrinkle-free cuff having a hose overlapping portion conforming to the outside diameter of the hose and a free end portion conforming to the inside diameter of the hose.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 2 is an end elevational view of the machine of FIGURE 1;

Figure 1:
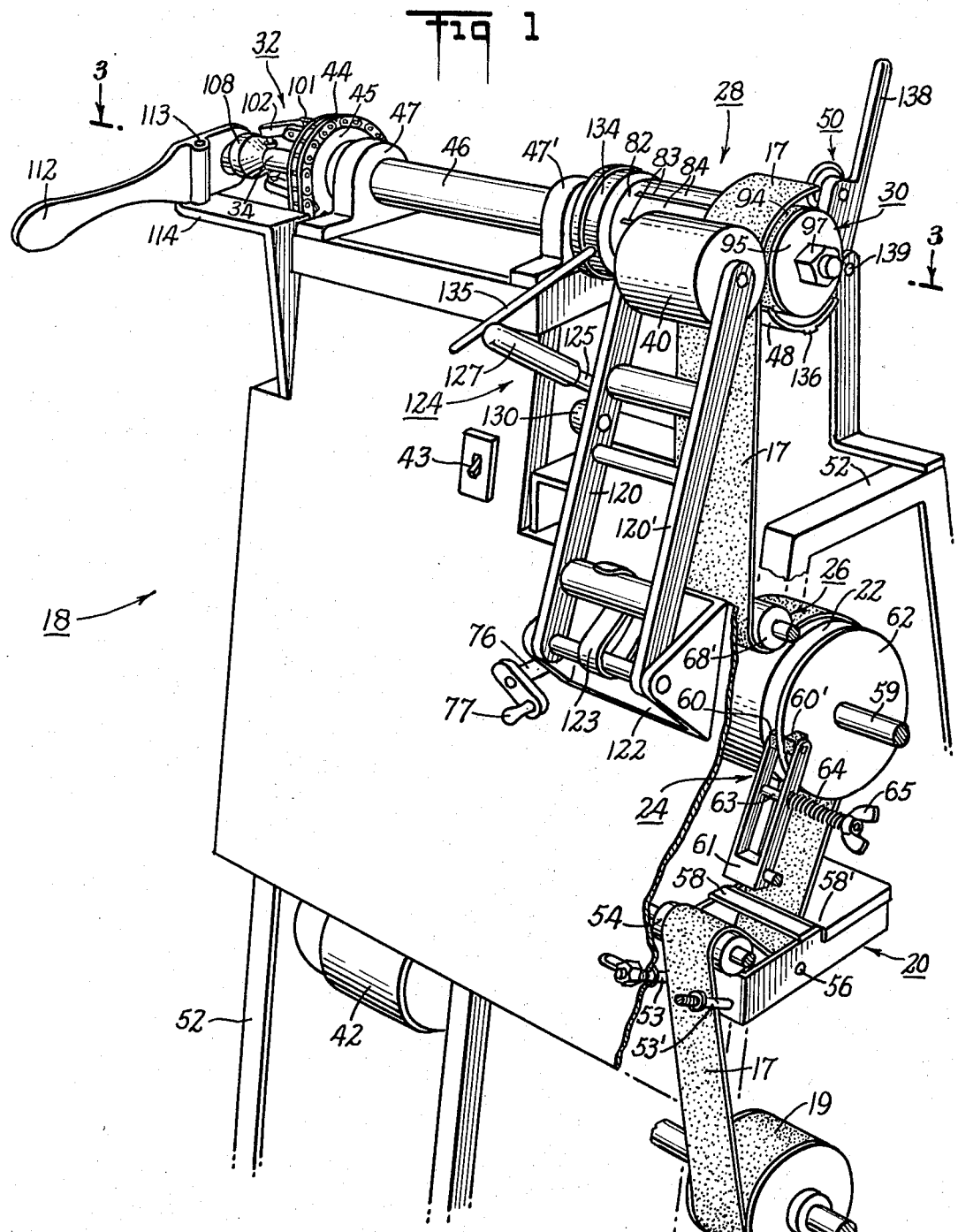
FIGURE 1 is a perspective view of a cuffing machine constructed according to the present invention.

FIGURES 3A and 3B, when put together, constitute an interrupted sectional view taken along line 3—3 of FIGURE 1 with a hose end portion in position to be cuffed;

FIGURE 4 is a sectional view taken along line 4—4 of FIGURE 2; and

FIGURE 5 is a fragmentary cross-sectional view of a portion of the machine of FIGURE 1 with a hose end portion in position after completion of a cuffing operation.

Similar reference characters refer to similar parts throughout the several views of the drawings.

Referring now to the drawings and particularly to the extreme right of FIGURE 3B, the hose, generally indicated at 10, is formed from a helically wound overlapping tape 12 having wire reinforcement 14 incorporated along one edge. The overlapping portions of each tape convolution are adhered together to form a substantially rigid, elongated tubular structure, all in the manner taught in the above-noted patents. The end of the hose 10, squared off by any suitable means, is generally indicated at 10a.

Turning to FIGURE 5, a cuff, generally indicated at 16 consists of two to three overlying wraps of cuffing tape 17 wound around the end of the hose 10. The extent of overlap of the cuff 16 with the end portion of the hose 10 is largely a matter of choice but is typically one-half of the width of the cuffing tape 17. Thus, with a two inch wide cuffing tape 17, the overlap is one inch, leaving an inch of cuff extending beyond the end 10a of the hose 10.

Turning to FIGURES 1 and 2 of the cuffing machine generally indicated at 18, the cuffing tape 17 is drawn from a supply roll 19 and passed through a tray, generally indicated at 20, where an adhesive coating is applied to both sides of the tape. The cuffing tape is then drawn over a tension roll 22 whose rotation is resisted by a brake mechanism, generally indicated at 24 in FIGURE 1. The cuffing tape 17, now under considerable tension, is differentially stretched by an axially offset roller assembly, generally indicated at 26 and seen most clearly in FIGURE 4.

The end of the cuffing tape 17 is brought to a cuff winding zone generally indicated at 28 (in FIGURES 1 and 2). An expandable mandrel, generally indicated at 30 and best seen in FIGURE 3B, is dimensioned such that the end of the hose 10 to be cuffed can be slipped over its free end. A mechanism, generally indicated at 32 in FIGURE 1 and seen clearly in FIGURE 3A, is operated to axially shift a shaft 34 (FIGURES 3A and 3B) so as to radially expand the mandrel 30. The portion of the mandrel, generally indicated at 36 in FIGURE 3B, grips the inner surface of the hose 10 adjacent end 10a while the mandrel portion beyond the end of the hose, generally indicated at 38, spreads radially to provide a backing surface conforming to the inside diameter of the hose.

The free end of the cuffing tape 17 is placed in partial overlapping contact with the end of the hose 10 with the portion extending beyond the end of the hose contacting the backing surface 38 of the mandrel 30. A pressure roller, indicated at 40 in FIGURES 1 and 2, is swung into position to insure intimate contact of the cuffing tape 17 with the hose 10 and the mandrel 30.

A motor, generally indicated at 42 in FIGURE 1, is energized by operation of a switch 43 to rotate the mandrel 30 and hose 10 via a suitable reduction unit (not shown) and a drive chain 44 engaging a drive sprocket 45 which is keyed to a drive shaft 46. The drive shaft 46 is journalled in spaced bearings 47, 47'. The cuffing tape 17, drawn over the tension roller 22 and the differential stretch roller assembly 26, is wound in overlying wraps about the end of the hose 10. Due to the axial offset mounting of the roller assembly 26, seen in FIGURE 4, the cuffing tape 17 is wound in wrinkle-free, overlying wraps with the more stretched longitudinal portion of the tape wrapped tightly about the end portion of the hose 10, and the remaining longitudinal portion, stretched to a lesser degree, wrapped tightly about the backing surface 38 of the mandrel 30.

After a sufficient number of wraps of the cuffing tape 17, usually two or three, the motor 42 is de-energized. The pressure roller 40 is then swung away from the mandrel and a platen, generally indicated at 48 (FIGURE 1 and FIGURE 2), is revolved into position between the cuffing tape 17 and the mandrel 30. The motor 42 is energized for a short period to rotate the mandrel 30 through approximately a quarter of a revolution, bringing the platen 48 fully under the cuffing tape 17 and between the mandrel. A hand knife is used to make a transverse cut against the platen 48 to sever the cuffing tape 17.

The platen 48 is then revolved to the remote position shown in FIGURE 1. Due to the adhesive coating, the free end of the cuffing tape supply adheres to the platen 48 keeping it handy for the next cuffing operation.

The pressure roller 40 is swung into position and the mandrel 30 is again rotated by the motor 42 to roll down the final wrap of cuffing tape 17.

A cutter, generally indicated at 50 in FIGURE 1, is brought down on the rotating mandrel 30 to trim the free end of the cuff.

The motor 42 is de-energized and the mechanism 32 is operated to contract the mandrel 30 allowing removal of the cuffed hose.

Referring to FIGURES 1 and 2, the cuffing machine 18 comprises an upright support frame 52 for mounting the various operating elements of the machine. The supply roll 19, detachably mounted in a suitable manner on cross members of the support frame 52, plays out a continuous strip of cuffing tape 17. A pair of tape guide pins 53 and 53' (FIGURE 1), adjustably mounted on the support frame 52 for various tape widths, centers the cuffing tape 17 passing between them. The cuffing tape 17 is drawn over an idler roller 54 and under a rod 56 mounted adjacent the bottom of the tray 20 (FIGURE 2). The tray 20 is filled with a suitable adhesive 57. The cuffing tape 17, in passing through the tray 20, has an adhesive coating applied to both sides. A pair of fixed knife blade scrapers 58 and 58' mounted atop the tray 20, as seen in FIGURE 2, remove excess adhesive from both sides of the cuffing tape 17 as it leaves the tray.

The cuffing tape 17 is drawn over the tension roll 22 keyed to a shaft 59 which is suitably journalled on the frame 52. As seen in FIGURE 1, the brake mechanism 24 comprises a pair of brake shoes 60 and 60' mounted by a U-shaped bracket 61 to bear against opposite surfaces of a brake disc 62 keyed to shaft 59. A bolt 63 passing through apertures in each brake shoe mounting arm of the U-shaped bracket 61 carries a helical spring 64 which urges the brake shoes 60 and 60' against the brake disc 62. Brake pressure is adjusted by selectively compressing the spring 64 with a thumb nut 65 threaded on the end of bolt 63. It will thus be seen that the cuffing tape 17, in being drawn over the roll 22, is put in tension by virtue of the brake mechanism 24.

The cuffing tape 17 then passes under the differential stretching roller assembly 26, best seen in FIGURE 4. This assembly consists of a pair of rollers 68 and 68' individually mounted in a box frame 70, which is mounted on the frame 52. The roller 68' rotates freely on a pin 71 having one end affixed in one side of the box frame 70. The other roller 68 rotates freely on a pin 72 having one end affixed in a slide block 74. The block 74 is slidable in a channel 75 carried by the box frame 70. A threaded shaft 76 collared in the frame 70 screws into the block 74. The shaft 76 is turned by a handle 77 to slidably position the block 74 in the channel 75 and, in turn, position the roller 68 relative to the roller 68'.

It will be seen that, as the position of the block 74 is varied, the degree of axial offset of the rollers 68 and 68' is varied. As the cuffing tape 17 is drawn around rollers 68, 68' under considerable tension by virtue of the tension roller 22, the longitudinal portion 17a of the tape passing around roller 68' will be stretched to a greater degree than the longitudinal portion 17b drawn around roller 68.

The provision of these differential stretching rollers 68 and 68' is necessary because of the fact that the cuffing tape 17 is being overlapped with the end portion of the hose 10. Since it is quite important that the inner diameter of the cuffed hose be substantially uniform even to the very end of the cuff 16, it becomes necessary to stretch the portion 17a of the cuffing tape 17 which overlaps the end portion of the hose 10 to a greater degree than the portion 17b extending beyond the end 10a of the hose. In other words, since the cuffing tape 17 partially overlaps with the end of the hose 10, the overlapping portion 17a must be somewhat longer than the remaining portion 17b wound on the backing surface 38 of the mandrel 30. In this manner, a substantially wrinkle-free cuff 16 is formed about the end of the hose 10.

From the differential stretching roller assembly 26, the cuffing tape 17 is brought upwardly to the mandrel 30 over which the end of the hose 10 is slipped. As seen in FIGURE 3B, the mandrel 30 consists of a collar 80 keyed to the drive shaft 46. A cylindrical member 82 is mounted by any suitable means, such as welding, on an annular shoulder formed in the collar 80. The cylindrical member 82 is slotted, as indicated at 83, to form a plurality of resilient fingers 84. The outer surface of the fingers 84 extending back from their free ends is slightly tapered inwardly to form the backing surface 38, previously discussed. The corresponding inner surface of the fingers 84 is also tapered to form an annular cam surface indicated at 86.

The axially reciprocating shaft 34 passes through the hollow center of the drive shaft 46. A stud bolt 88 is threaded into the end of the shaft 34 to become a variable extension thereof. A collar 87, pinned to the stud bolt 88, is provided with an annular cam surface 87a engaging the cam surface 86 of the individual resilient fingers 84. A circular plate 89 having a central aperture is slipped on the stud bolt 88 and abuts the ends of the fingers 84. A tubular sleeve 90 is affixed to the plate 89 coaxially with the stud bolt 88. A tubular member 91 having a radial flange 92 telescopes over the sleeve 90 to form an annular channel 93 to receive an annular rubber insert 94. A circular end plate 95 and a lock washer 96 slip on the stud bolt 88 and nut 97 threaded on the outer end of the stud bolt holds the various parts of the mandrel 30 together.

The end of the hose 10 to be cuffed is slipped on the portion 36 of the mandrel 30 to a point where the end 10a of the hose is aligned with the free ends of the fingers 84 as shown in FIGURE 3B. When the shaft 34 is shifted to the left, as seen in FIGURE 3B, by the mechanism 32 shown in FIGURE 3A, the thrust of the end plate 95 causes the tubular member 91 to telescope over the sleeve 90. The flange 92 moves toward the plate 89 causing a reduction in the width of channel 93. The rubber insert 94 bulges radially outward to grip the inner surface of the hose 10. This condition is shown in FIGURE 5. The degree to which the rubber insert 94 bulges to grip the end of the hose 10 is readily varied by turning the nut 97 on the stud bolt 88.

Simultaneously, with the expansion of the mandrel 30 to grip the end of the hose 10, the collar 87 is forced to move to the left, as seen in FIGURE 3B, by the movement of shaft 34. The cam surface 87a of the collar 87 coacts with the cam surface 86 to wedge the fingers 84 radially outward. The tapered backing surface 38 carried by the fingers 84 moves into conformation with the inner surface of the hose 10. That is, the diameter of the portion of the mandrel 30 constituted by the backing surface 38 is equal to the inside diameter of the hose 10. This condition, shown in FIGURE 5, is made possible by virtue of the slight inward tapering of backing surface 38.

When the cuffing tape 17 is wound around the mandrel 30, partially overlapping with the end of the hose 10, the longitudinal portion of the tape contacting the backing surface 38 forms a cuff 16 (FIGURE 5) having the same inside diameter as the hose. When the mandrel 30 is contracted by operation of the mechanism 32, the shaft 34 and the stud bolt 88 move to the right as seen in FIGURE 3B. The rubber insert 94 contracts to release the hose 10. The resilient fingers 84 swing radially inward causing the backing surface 38 to assume a diameter smaller than the inside dimensions of the cuff 16. The cuffed hose is then readily removed from the mandrel 30.

The mechanism 32 for axially shifting the position of the shaft 34 will now be described in conjunction with FIGURE 3A.

A collar 100 is keyed to the end of the drive shaft 46 extending beyond the sprocket 45. A pair of ears 101 and 101', integrally formed with the collar 100, pivotally mount a pair of bell cranks 102 and 102'. The inner ends of the bell cranks 102 and 102' are formed into dogs 103 and 103' disposed in a groove 104 in the shaft 34. A pair of followers 105 and 105' are threaded through the other ends of the bell cranks 102 and 102'. Lock nuts 106 and 106' threaded on the ends of the followers 105, 105' serve to maintain the effective length of the followers. A spring 107, with its ends affixed to the bell cranks 102, 102', urges the followers 105, 105' radially inwardly against the shaft 34.

A collar 10 slidably mounted on the shaft 34 is formed having a cam surface 109 and an annular recess 110. A lever 112 pivotally mounted at 113 on an extension 114 of the frame 52 is provided with a forked end for mounting a pair of rollers 116 positioned at opposed points in the recess 110 of the collar 108.

In order to axially shift the shaft 34 to the left, the lever 112 is manipulated so as to slide the collar 108 to the right, as seen in FIGURE 3A. The annular cam surface 109 of the collar 108 rides under the followers 105, 105' forcing the bell cranks 102, 102' to swing outwardly. As a result, the dogs 103, 103' disposed in the recess 104 urge the shaft 34 to the left, as seen in FIGURE 3A. As previously described, the shaft 34, in shifting to the left, expands the mandrel 30 (FIGURE 3B). The extent of axial movement of the shaft 34 may be adjusted by varying the effective length of the followers 105, 105'.

If the lever 112 is pivoted in the opposite direction, the collar 108 rides out from under the followers 105, 105'. As a result, the bell cranks 102, 102' are pivoted in the opposite direction by the spring 107. The shaft 34 is axially shifted in the opposite direction or to the right as seen in FIGURES 3A and 3B to contract the mandrel 30 in the manner previously described.

Returning to FIGURES 1 and 2, the pressure roller 40 bears against the mandrel to insure adherence of the cuffing tape 17 to the end of the hose 10 and of the overlying wraps of the cuffing tape to each other. The pressure roller 40 is rotatably mounted at the ends of a pair of arms 120, 120' (FIGURE 1). The other ends of the mounting arm 120, 120' are swingably mounted by a bracket 122 affixed to the frame 52. A spring 123 normally urges the pressure roller 40 away from the mandrel 30. The pressure roller 40 is swung into its operating position against the mandrel 30 by a toggle mechanism, indicated generally at 124 in FIGURE 2.

The toggle mechanism 124 consists of a lever 125 which rotates on a pin 126 fixed to the frame 52. One end of the lever 125 is formed into a handle 127 while the other end is pivotally connected to one end of a linkage, indicated generally at 128. The other end of the linkage 128 is pivotally connected to the pressure roller mounting arm 120. The length of the linkage 128 is adjusted in "turn buckle" fashion by an interconnecting stud bolt 129 threaded into the separate end elements 130, 130' of the linkage 128. The stud 129 is provided with a hex-shaped mid-portion 131 so that a wrench may be used to turn the stud bolt and vary the length of the linkage 128. It will be seen that a variation in the length of linkage 128 varies the pressure of the pressure roller 40 against the mandrel 30.

It will be seen that as the toggle mechanism 124 is pivoted about the pin 126, the pressure roller 40 is moved against the mandrel 30, as shown in solid, or moved away from the mandrel, as shown in phantom in FIGURE 2. The pressure roller 40 is brought from the remote position by swinging the handle 127 upwardly. This brings the linkage 128 downward from the position shown in phantom until it aligns with the lever 125. As the linkage 128 moves beyond the plane of the lever 125 and pin 126, the toggle mechanism 124 is off-centered and the pressure roller 40 is brought to bear against the mandrel 30. To retract the pressure roller 40, the handle 127 is manipulated to off-center the toggle mechanism 124 in the opposite direction and the spring 123 assists in swinging the pressure roller away from the mandrel 30.

The platen 48, having an arcuate surface configuration as seen in FIGURES 1 and 2, is affixed to a hub 134 suitably journalled so as to rotate freely on the drive shaft 46, as seen in FIGURE 3B. A handle 135 extending radially from the hub 134 is used to rotate the hub bringing the platen 48 between the cuffing tape 17 and the mandrel 30. In practice, the platen 48 is revolved from its position beneath the mandrel 30 to a position above it, as seen in phantom in FIGURE 2. In the latter position, the cuffing tape 17 lies on the outer surface of the platen 48. A ledge 136 on the outer surface of the platen 48 provides a straight edge to guide a hand knife in severing the cuffing tape 17.

The cutter wheel 50 is rotatably mounted on an arm 138 which is pivotally mounted at 139 to the frame 52, as best seen in FIGURE 1. As previously described, the cutter wheel 50 is used to trim the free edge of the cuff 16, as seen in FIGURE 5, after it has been formed about the end of the hose 10.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. In an apparatus for forming a cuff about the end of a tubular member, the combination comprising:
   (A) a mandrel
      (1) for receiving the end portion of said tubular member slipped over said mandrel;
   (B) means for expanding said mandrel
      (1) to grip said member along its inner surface and
      (2) to provide a backing surface beyond the end of said member conforming to the inner surface of said member;
   (C) means supplying a cuffing material in the form of an elongated tape under tension to said mandrel;
   (D) means stretching one longitudinal edge of said tape with respect to the opposite longitudinal edge thereof; and
   (E) drive means for winding said cuffing material on said mandrel with said stretched longitudinal edge in overlapping relationship with the end portion of said member, and said opposite longitudinal edge in overlapping relationship with said mandrel whereby said cuffing material readily conforms to the outer surface of said tubular member and the backing surface of said mandrel.

2. The combination defined in claim 1 and
   (F) a pressure roller removably positioned to bear against said mandrel so as to insure adherence of said cuffing material to said tubular member.

3. In an apparatus for forming a cuff about the end of a tubular member, the combination comprising:
   (A) a mandrel,
      (1) for receiving the end portion of said tubular member slipped over said mandrel;
   (B) means for expanding said mandrel;
      (1) to grip said member along its inner surface and
      (2) to provide a backing surface beyond the end of said member conforming to the inner surface of said member;
   (C) means supplying a quantity of cuffing tape;
   (D) means for guiding said cuffing tape over a path from said supply to said mandrel, said guiding means including,
      (1) a tension roll and
      (2) a pair of axially offset differential tape stretching rollers; and
   (E) drive means for rotating said mandrel and said tubular member,
      (1) to draw said tape around said tension roll and said differential stretching rollers, and tightly wind said tape around said mandrel in partial overlapping relationship with the end portion of said member, whereby said cuffing tape is differentially stretched so as to smoothly conform to both the outer surface of said member and the backing surface of said mandrel.

4. The combination claimed in claim 3 wherein said guiding means further includes means for applying an adhesive coating to both sides of said cuffing tape.

5. The combination defined in claim 4 and
   (F) means exerting pressure on said mandrel as said cuffing tape is wound thereon to adhere said tape to the end portion of said member, said means including
      (1) a pressure roller bearing against said member and the backing surface of said mandrel and
      (2) a toggle mechanism for swinging said pressure roller against and away from said mandrel, said mechanism including
         (a) a linkage of adjustable length so as to vary the pressure of said pressure roller.

6. The combination defined in claim 5 wherein said drive means winds said cuffing tape around said mandrel in a plurality of overlying wraps.

7. In an apparatus for forming a cuff about the end of a flexible hose, the combination comprising:
   (A) an expandable mandrel including
      (1) a cylindrical member having a slotted end portion,
         (a) said slotted end portion being formed with an outer tapered surface portion and an inner cam surface portion,
      (2) a pair of telescoping members forming a variable width annular channel,
         (a) said channel being disposed adjacent to said slotted end portion and aligned coaxially with said cylindrical member,
      (3) an insert of elastomeric material disposed in said channel,
      (4) said mandrel being adapted to receive said hose slipped thereover and to axially align the end of said hose at the end of said cylindrical member;
   (B) means for expanding said mandrel including
      (1) a shaft coaxially aligned with said mandrel,
      (2) operable means for axially shifting the position of said shaft,
      (3) a cam connected to said shaft and movable therewith,
         (a) said cam coacting with said cam surface portion to spread the slotted end of said cylindrical member thereby disposing the tapered surface of said cylindrical member in conformity with the inner surface of said hose, and
      (4) a variable extension movable with said shaft to move said telescoping members relative to each other so as to decrease the width of said channel and cause said insert to bulge radially outward and grip the inner surface of said element;
   (C) means supplying a cuffing tape to said mandrel; said supply means including,
      (1) tape tensioning means and
      (2) differential tape stretching means for stretching one longitudinal edge of said cuffing tape relative to the other longitudinal edge;
   (D) means rotating said mandrel to wind said cuffing tape from said supply means around said mandrel in partial overlapping relationship with the end of said hose, with said stretched longitudinal edge wound about the end of said hose and said other longitudinal edge wound about the tapered surface portion of said cylindrical member.

8. The combination defined in claim 7 wherein said operable means of said mandrel expanding means includes:
(a) a collar slidably mounted on said shaft and having a cam surface,
(b) a pair of bell cranks pivoted about a fixed point, said bell cranks having
  (i) one end engaging said shaft and
  (ii) the other end carrying a follower, and
(c) an operating lever engaging said collar to slide said collar so as to bring the cam surface of said collar under said followers and pivoting said bell cranks thereby shifting the axial position of said shaft.

9. The combination defined in claim 8 and
(E) a pressure roller mounted to bear against said mandrel; and
(F) a toggle mechanism for swinging said pressure roller to and from said mandrel, said toggle mechanism including
  (1) a linkage variable in length to adjust the pressure of said pressure roller against said mandrel.

10. The combination defined in claim 9 and
(G) a platen mounted to revolve into position between said mandrel and said tape to provide a surface upon which said tape may be severed; and
(H) a cutter pivotally mounted adjacent said mandrel whereby it can be pivoted to trim the edge of said tape after the cuff has been formed.

References Cited

UNITED STATES PATENTS

| | | | |
|---|---|---|---|
| 2,416,523 | 2/1947 | Haren et al. | 156—446 X |
| 1,665,585 | 4/1928 | Esch | 156—446 X |
| 2,876,154 | 3/1959 | Usab | 156—187 X |
| 1,931,924 | 10/1933 | Denmire | 156—494 X |

EARL M. BERGERT, *Primary Examiner.*

PHILIP DIER, *Examiner.*